United States Patent [19]
Nurse

[11] 4,214,776
[45] Jul. 29, 1980

[54] PICK UP CONTAINER FOR THREE POINT TRACTOR HITCH

[76] Inventor: William W. Nurse, 10806 Harley Rd., Lorton, Va. 22079

[21] Appl. No.: 950,166

[22] Filed: Oct. 10, 1978

[51] Int. Cl.² .............................................. B60P 1/02
[52] U.S. Cl. ................................ 280/760; 280/12 R; 280/415 A
[58] Field of Search ........... 280/415 R, 415 A, 415 B, 280/461 R, 461 A, 497, 12 R, 18, 19, 24, 760; 414/703

[56] References Cited

U.S. PATENT DOCUMENTS

| | | | |
|---|---|---|---|
| 2,425,892 | 8/1947 | Michaels | 280/760 X |
| 2,646,910 | 7/1953 | Wiershing | 280/760 X |
| 2,712,358 | 7/1955 | Kuhary et al. | 280/461 A |
| 2,735,651 | 2/1956 | McClernon | 280/760 X |
| 3,972,308 | 8/1976 | Ray | 414/703 |
| 4,002,147 | 1/1977 | Ferterl | 414/703 |

FOREIGN PATENT DOCUMENTS

| | | | |
|---|---|---|---|
| 2022599 | 11/1971 | Fed. Rep. of Germany | 280/760 |
| 1347838 | 11/1963 | France | 280/760 |

*Primary Examiner*—John A. Pekar
*Attorney, Agent, or Firm*—Shlesinger, Arkwright, Garvey and Dinsmore

[57] ABSTRACT

The present invention comprises a transport platform which is easily attachable to a three point hitch assembly of a tractor and provides a platform on which to haul a variety of articles. The transport platform of the present invention may be converted into a transport box and may be either supported above the ground by the hitch assembly or may be drawn along the ground supported by integral skids.

10 Claims, 4 Drawing Figures

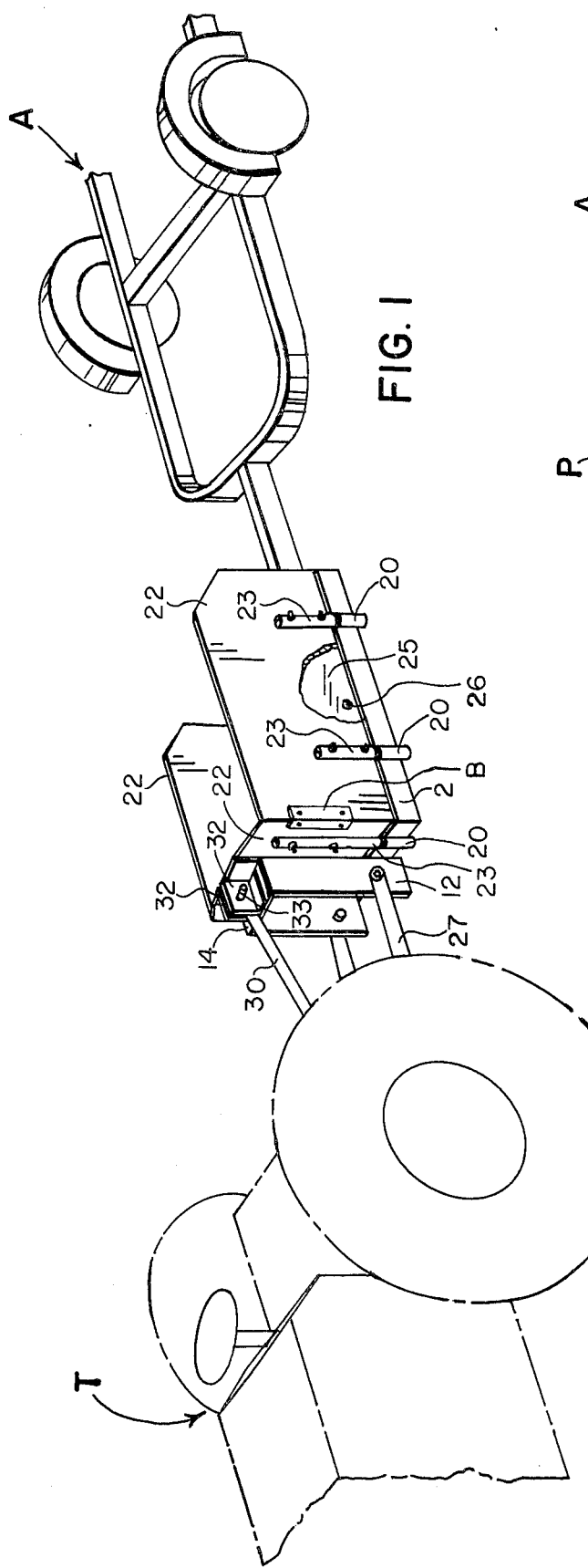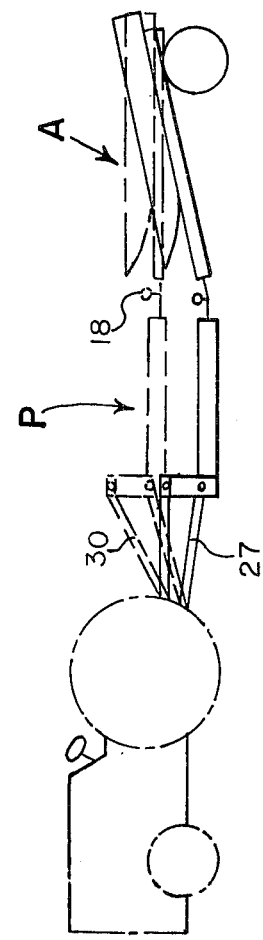

PICK UP CONTAINER FOR THREE POINT TRACTOR HITCH

BACKGROUND AND FIELD OF INVENTION

The present invention relates to transport platforms or boxes which are attached to the hitch assembly of a tractor for providing carriers for a variety of size and weight articles.

Transport platforms of the prior art which are attachable to a three point hitch assembly of a tractor are disclosed in U.S. Pat. No. 2,735,651 to McClernon and German Offenlegungsschrift 2,022,599. Transport boxes of the prior art which are attachable to a tractor are disclosed in U.S. Pat. Nos. 2,425,892 to Michaels and 2,646,910 to Wiershing. All of these prior art inventions must be at all times fully supported by the hitch assembly of the tractor. As a result, none of these prior art inventions provide a transport platform or box which may perform work ranging from carrying very light articles to dragging of very heavy articles. In addition, all of the above mentioned prior art inventions are either in the form of a box or in the form of a platform and are not easily convertable from one form to the other.

OBJECTS AND SUMMARY

It is therefore one object of the present invention to provide a transport platform for carrying a wide variety of articles and which is attachable to a tractor three point hitch assembly.

It is another object of the present invention to provide a transport platform which may be used to transport very heavy articles by being easily drawn along the ground by the attached tractor.

It is still another object of the present invention to provide a transport platform which is constructed with integral runners or skids on which the transport platform is easily drawn along the ground.

A further object of the present invention is to provide a transport platform which may be easily and quickly converted to a transport box.

A still further object of the present invention is to provide a transport platform which is provided with a rear hitch assembly for attachment to another towed vehicle.

A still further object of the present invention is to provide a transport platform which may be constructed of a variety size and weight materials to provide transport platforms of varying strength and weight capacity.

These and further objects of the present invention are accomplished by providing a transport platform which is easily attachable to a three point hitch assembly of a tractor, is easily convertable to a transport box by attachment of side panels any may be either supported above the ground by the tractor hitch assembly or may be easily drawn along the ground supported by runners or skids which are an integral part of the transport platform.

DESCRIPTION OF THE DRAWINGS

FIG. 1 is a perspective view of the transport platform of the present invention attached to a tractor and modified to provide a transport box with an attached towed trailer at the rear of the transport box a portion being broken away to show the trailer bed.

FIG. 2 is a side elevation of the transport platform of the present invention showing in dash lines the raised position and in solid lines the lowered position with an attached towed vehicle trailer.

DETAILED DESCRIPTION OF THE INVENTION

Figure 3:
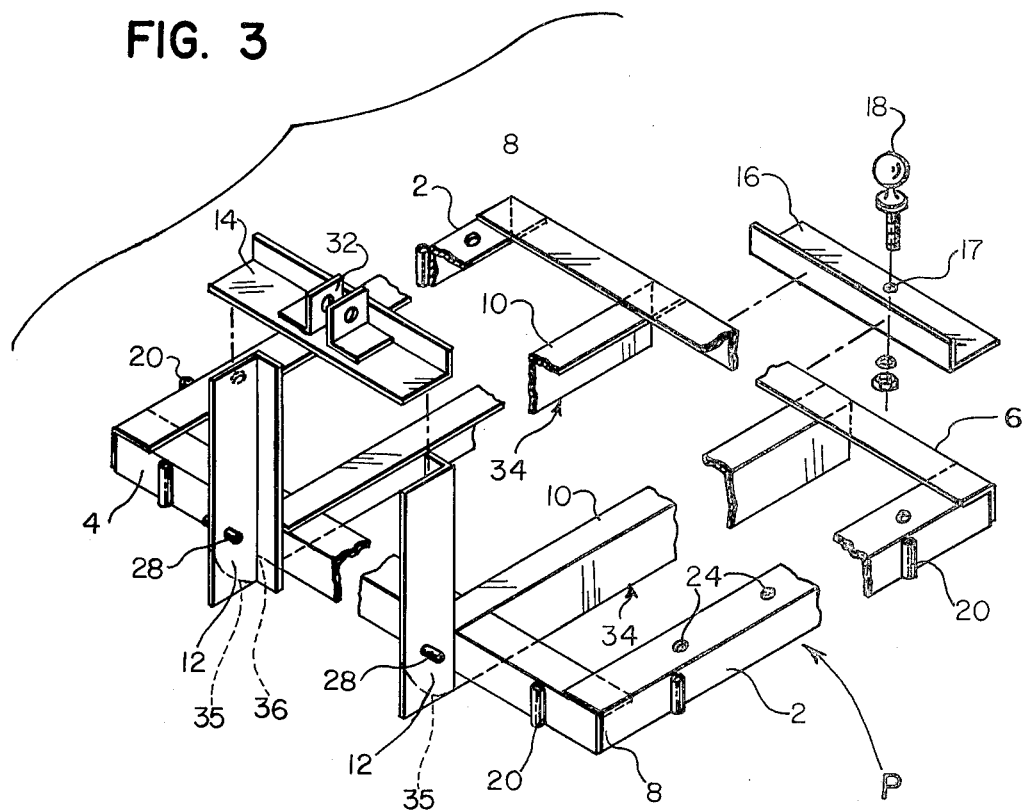
FIG. 3 is an exploded perspective view of the transport platform of the present invention portions of which are broken to provide cross sectional viewing.
Figure 4:
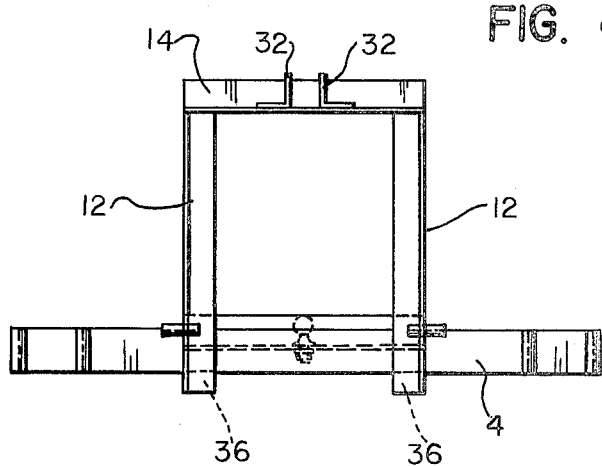
FIG. 4 is a front plan view of the transport platform of the present invention.

Referring now to the drawings in which FIG. 3 is an exploded view of the invention, the transport platform P of the present invention is basically comprised of outer side frame members 2, outer front frame member 4 and outer rear frame member 6 which are joined together at welded joints 8 in the form of a rectangle with inner frame member 10 running from outer front member 4 to outer rear member 6. Outer front frame member 4 is provided with vertical support members 12 which are joined together at the top by support brace 14, all of which, the vertical support members 12 and support brace 14, serve as attachment means to the three point hitch of tractor T (FIG. 1). Trailer brace 16 is welded to outer rear frame member 6 and has an opening 17 for attaching to it a ball hitch assembly 18 to which can be attached a variety of towed vehicles or trailers A. In addition, to allow transport platform P is to be converted into a transport box, cylindrical receptacles 20, attached to the outside face of the outer side frame members 2 and outer front frame member 4, provide a receptacle and brace for the side and front panels 22 which are provided with posts 23 which are bolted or otherwise secured to the side and front panels 22 for positioning in cylindrical receptacles 20. Holes 24 in the top face of outer side frame members 2 allow for the attachment of floor 25 by bolts 26. The panels 22 at the front are secured together at their edges by angle iron brackets B to provide rigidity.

In its use, the transport platform T is attached to the three point hitch of a tractor T, by attaching the tension links 27 to the pins 28 on the vertical support members 12 and securing by cotter pins (not shown), nuts (not shown) or the like. The draw bar 30 is attached to the brackets 32 on the support brace 14 (FIG. 3) by a bolt, clevis or the like. After being attached to a tractor T, transport platform P may be used in a raised position (as shown in FIGS. 1 and 2) and may additionally have a towed trailer A attached to the ball hitch 18. Alternatively, the transport platform P may be utilized in a lower position and may be drawn along the ground (FIG. 2). When being drawn along the ground, the bottom edge or runner 34 of the inner frame members 10, which projects below the bottom face of any of the other support members, acts as a skid or runner upon which the platform P may rest against the ground. By acting as a skid or runner, the bottom edge 34 of the inner frame members 10 provides a surface which allows the transport platform P to be drawn along the ground with much less hindrance than would be present if the transport platform P was not provided with any runners.

In assembly of the platform P, the various parts may be welded together (preferred) or otherwise secured by bolts, rivets, etc. Angle irons are preferred and overlapped for strength. It is an important feature of the transport platform P of the present invention that the runners 34 are an integral part of the inner frame members 10 instead of being part of the outer frame members 12. By positioning the runners 34 with the inner frame members 10, a smaller turning radius is provided for the platform P than would be attainable with the runners 34 being positioned with the outer frame members 12. In addition this positioning of the runners 34 minimizes, especially during turning of the platform, the amount of dirt or other material that is accumulated at the runners 34.

The front end of the vertical support member 12 may be curved as shown in the broken lines at 35. The vertical support member 12 may also be cut out as at 36. The curved front end 35 and cut out 36 serve to prevent accumulation of trash or the like when the platform P is dragged along the skids 34.

In its modified form, transport platform P may be converted into a transport box by attachment of floor 26 and side panels 22. This modified form of the present invention allows the user to transport loose articles as well as compact solid articles which are best transported by the present invention in the form of a transport platform P.

While this invention has been described as having a preferred design, it will be understood that it is capable of further modification. This application, is, therefore, intended to cover any variation, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A transport platform for attachment to a tractor or the like comprising:
   (a) a horizontal support frame having a front and a rear and comprised of outer and inner frame members;
   (b) said outer frame members being joined together to form a rectangle with said inner frame members positioned within said rectangle;
   (c) said outer frame member being equal and coextensive in height;
   (d) a pair of vertical frame members having a top and a bottom portion with said bottom portion of said vertical frame members being securedly attached to the front of said horizontal support frame;
   (e) said pair of said vertical frame members being coextensive and having a portion extending below said bottom portion of said outer frame members;
   (f) said outer and inner frame members having inner and outer sides, and a top and bottom portion;
   (g) said bottom portion of said vertical frame members having hitch engaging means positioned above said portion extending below said bottom portion of said outer frame members;
   (h) said top portion of said vertical support frame having hitch engaging means;
   (i) said inner frame members including a substantially parallel pair extending from said front to said rear of said horizontal support frame and having their bottom portions extending below the bottom portions of said outer frame members a distance equal to said portion of said pair of said vertical frame members extending below said bottom of said outer frame members thereby providing runners to support said platform;
   (j) said horizontal support frame serving as a load support means;
   (k) said pair of said vertical frame members and said pair of inner frame members being aligned from front to rear; and,
   (l) said pair of said vertical and said pair of said inner frame members being positioned symmetrically with respect to the longitudinal axis of said platform so as to provide a substantial distance between each cooperating member of said pairs to provide a stable ground support.

2. A transport platform for attachment to a tractor or the like as in claim 1 and wherein:
   (a) said outer frame members having attached on the outer sides thereof, vertical receptacles for receiving vertical panel members.

3. A transport platform for attachment to a tractor or the like as in claim 1 and wherein:
   (a) said rear of said horizontal support frame having attached thereto a rear hitch assembly for engaging with a towed vehicle.

4. A transport platform for attachment to a tractor or the like as in claim 1 and wherein:
   (a) said horizontal support frame members having means for attachment of a floor to serve as a bed for said transport platform.

5. A transport platform for attachment to a tractor or the like as in claim 1 and wherein:
   (a) said hitch engaging means at said top portion of said pair of vertical frame members being a bracket between said pair of vertical frame members.

6. A transport platform for attachment to a tractor or the like as in claim 1 and wherein:
   (a) said outer frame members being inwardly facing angle irons.

7. A transport platform for attachment to a tractor or the like as in claim 1 and wherein:
   (a) said inner frame members being angle irons.

8. A transport platform for attachment to a tractor or the like as in claim 7 and wherein:
   (a) said angle irons of said inner frame members face inwardly toward each other.

9. A transport platform for attachment to a tractor or the like as in claim 1 and wherein:
   (a) said runners being rounded at the ends at said front of said horizontal support frame thereby providing a runner with minimum drag potential.

10. A transport platform for attachment to a tractor or the like as in claim 1 and wherein:
    (a) said vertical frame members being angle irons and having a forward extending portion and a portion extending transverse to the longitudinal axis of said platform and a portion of said portion extending transverse to said longitudinal axis of said platform at said bottom being notched to provide minimum drag.

* * * * *